United States Patent [19]
Degen

[11] Patent Number: 5,228,992
[45] Date of Patent: Jul. 20, 1993

[54] PROCESS FOR PREPARING HOLLOW FIBER SEPARATORY DEVICES

[75] Inventor: Peter J. Degen, Huntington, N.Y.

[73] Assignee: Pall Corporation, Glen Cove, N.Y.

[21] Appl. No.: 845,018

[22] Filed: Mar. 3, 1992

[51] Int. Cl.⁵ .............................................. B01D 69/08
[52] U.S. Cl. ........................... 210/321.8; 210/321.89;
210/500.23; 264/41; 264/523; 264/219;
264/232; 264/330
[58] Field of Search ........... 210/321.8, 321.79, 321.87,
210/321.88, 321.89, 500.23; 264/41, 45.1, 500,
523, 524, 529, 572, 573, 174, 219, 232, 239, 318,
319, 328.8, 330, 331.11, DIG. 48, DIG. 62

[56] References Cited

U.S. PATENT DOCUMENTS

| | | |
|---|---|---|
| 3,262,808 | 7/1966 | Crooks et al. . |
| 3,524,546 | 8/1970 | Hoehn et al. . |
| 3,697,351 | 10/1972 | Harmer et al. . |
| 3,728,425 | 4/1973 | Schrader . |
| 3,882,024 | 5/1975 | Holmes et al. ................... 210/321.8 |
| 4,014,798 | 3/1977 | Rembaum . |
| 4,130,689 | 12/1978 | Costa, Jr. . |
| 4,269,712 | 5/1981 | Hornby et al. . |
| 4,276,249 | 6/1981 | Holladay . |
| 4,323,453 | 4/1982 | Zampini . |
| 4,800,019 | 1/1989 | Bikson et al. . |
| 4,808,378 | 2/1989 | Nakanishi et al. . |
| 4,865,735 | 9/1989 | Chu et al. . |
| 4,885,086 | 12/1989 | Miura . |
| 4,980,060 | 12/1990 | Muto et al. . |
| 5,032,269 | 5/1989 | Wollbeck et al. . |

FOREIGN PATENT DOCUMENTS 33911  5/1989  Australia .

OTHER PUBLICATIONS

Attachment A: Computerized Search of Data Base;
Attachment B: Computerized Search of Data Base.

*Primary Examiner*—Frank Sever
*Attorney, Agent, or Firm*—Leydig, Voit & Mayer

[57] ABSTRACT

A hollow fiber separatory device or module is produced by injection molding a thermoplastic potting material around thermoplastic hollow fibers. The thermoplastic hollow fibers are enhanced in order to increase the fibers' ability to withstand the high temperatures inherent in injection molding techniques. Also disclosed is a process for preparing two or more hollow fiber modules whereby the fibers are potted in an hourglass configuration.

18 Claims, 2 Drawing Sheets

PROCESS FOR PREPARING HOLLOW FIBER SEPARATORY DEVICES

TECHNICAL FIELD

The invention relates to an improved process for producing hollow fiber separatory devices.

BACKGROUND OF THE INVENTION

A typical hollow fiber filter device is an apparatus having a plurality of fine, hollow, permeable (or semipermeable) fibers, the ends of which may be embedded or potted in a plastic resin header or sealing compound. After the resin cures, a portion of the header is cut, usually transverse to the longitudinal axis of the fibers, so that the ends of the fibers are exposed, thus allowing communication with the interior of the fibers. The hollow fiber devices are typically fabricated as units, referred to herein as modules, usually by casting the fibers in a U or hair-pin shape.

Hollow fiber filter devices typically filter a liquid or gas by passing the filtrate through the module and/or over the hollow fibers. In outside to inside fluid flow filtration, the filtrate passes from the outside of the fiber to the inside, leaving the undesirable component on the outside. The filtered component, on the inside of the fiber, then passes along the inside until it is discharged from the end of the module. In dead-end separation devices, the undesirable component may form a filter cake or filter layer along the outside of the fibers.

A wide variety of publications exist pertaining to the preparation and use of these devices. For example, hollow fiber filter devices have been used in gas-gas, gas-liquid, liquid-liquid, liquid-solid, etc. separations, primarily in water desalination, dialysis, microfiltration to remove bacteria and other fine particles from a liquid, detoxification of industrial wastes/sewage treatment, and ultrafiltration to remove very fine or dissolved solids from a liquid. The modules of the present invention are particularly suited for environments in which the liquid to be filtered is already relatively clean or pure, e.g., for use in the production of ultra-pure water used in electronics manufacturing.

Problems associated with the production of these devices are also well known, e.g., pressure build-up in the potted fibers; production of a clean, open fiber opening; formation of an adequate bond between the potting material and the fibers; and the expense in both time and money in using thermoset or epoxy-type potting resins. Furthermore, hollow fiber filter devices have typically not been capable of production using injection molding techniques, due to the fragility of the fibers and the high temperature conditions used in injection molding. For example, while the hollow fibers may be produced from a thermoplastic polymer, such fibers are not always adequately sealed by the potting compound and may flow or deform under elevated temperatures. Potting methods have been developed, therefore, which require a multiple-part system such as an epoxy and a urethane; however, these multiple-part systems are typically very time consuming and expensive, and do not consistently result in a adequate bond between the outer surface of the hollow fibers and the potting material. In addition, in the typical process employed by the prior art, the ends of a plurality of hollow fibers are bundled and placed in a mold which is then filled with a potting resin. The bundle must be fixed in the filled mold until the thermosetting potting compound cures.

SUMMARY OF THE INVENTION

The present invention combines the use of both a thermoplastic hollow fiber and a thermoplastic potting compound in a process wherein the potting compound is injection molded over the hollow fibers. The thermoplastic fibers are modified to withstand the high temperature environment of injection molding which is high enough to melt or deform the thermoplastic fibers in unmodified form. The present invention also includes a process whereby at least two hollow fiber separation modules are simultaneously formed, again preferably utilizing an injection molding process to pot the fibers.

DETAILED DESCRIPTION OF THE PREFERRED EMBODIMENTS

Figure 1:
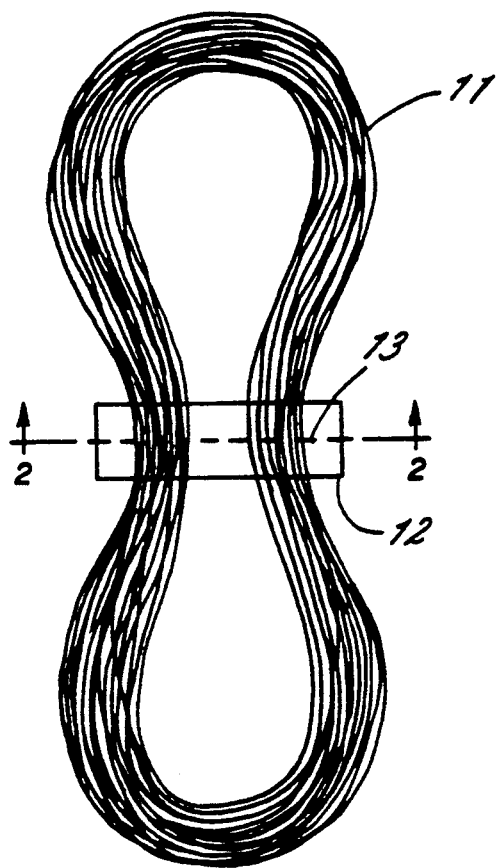
FIG. 1 is a schematic top view of an embodiment of the invention which illustrates an hourglass configuration of fibers embedded in potting compound.

In accordance with the invention, a hollow fiber separatory device or module is produced by injection molding a thermoplastic potting material around thermoplastic hollow fibers to thereby embed the fibers in the potting material. The thermoplastic hollow fibers are modified or enhanced in order to increase the fibers' ability to withstand the high temperatures associated with injection molding techniques. Thus, a hollow fiber separatory module capable of being produced by injection molding is provided.

In accordance with the invention, a wide variety of thermoplastic polymers may be used to form the hollow fibers. The preferred materials include, but are not limited to polyethylene, polyvinylidene difluoride (PVDF), and polytetrafluoroethylene (PTFE). Other exemplary materials for forming the hollow fibers include acetates, cellulose ethers, polyvinyl alcohols, polysaccharides, polyolefins, polyesters, polyamides, and polyurethanes.

Any of the foregoing materials, as well as other suitable permeable, hollow fiber forming materials can be utilized according to this invention. Also, the hollow fibers employed may be either inherently suitable, or may be modified so as to make the fibers suitable, for ion exchange purposes. Exemplary of such ionic exchange materials are those resinous materials containing such groups as carboxylic, sulfonic, phosphoric, amine, quaternary ammonium, mercaptan, and phenolic groups, such as sulfonated polyethylene, sulfonated polystyrene and the like. As used herein, thermoplastic, as differentiated from thermoset, refers to a polymer which softens and melts when exposed to heat and resolidifies when cooled to room temperature. On the other hand, a thermoset polymer irreversibly solidifies when heated. These polymers typically require a curing agent or agents. The fibers used in connection with the present invention are preferably hydrophilic, but, of course, the properties of the fibers are selected based on the intended or anticipated end use of the hollow fiber separation device.

Hollow fibers suitable for use according to the invention can be produced by techniques known in the art, including, but not limited to, melt, dry, or wet spinning processes.

The fibers may be configured into modules or bundles in a variety of shapes. The present invention preferably involves the configuration of a single continuous fiber or a collection of individual fibers into a loop or hourglass configuration. This preferred configuration facilitates the potting, by injection molding, of an intermediate section of the hourglass configuration. After the intermediate section of the bundle is potted, cutting along the transverse longitudinal axis of the fibers results in the formation of two modules. This procedure can be applied to simultaneously or near simultaneously prepare more than two hollow fiber separation devices by using, for example, a multi-lobed or multi-noded configuration wherein the hub or center is embedded in potting compound and a multi-lobed configuration wherein multiple sections are embedded in potting compound. Thus, in accordance with the invention, a number of modules can be simultaneously or near simultaneously produced by cutting or isolating each of the individual lobes from the multi-lobed configuration.

While the typical hollow fiber used in conventional hollow fiber filter devices is delicate and readily deforms in a high temperature environment, this is not the case with the hollow fibers used in the present invention. In accordance with the invention, the ability of the thermoplastic hollow fibers to withstand a high temperature environment, i.e., to resist deformation or melting, is enhanced by treating the hollow fibers in order to decrease the fibers' high temperature susceptibility to deformation. Thus, the hollow fibers are preferably subjected to radiation treatment in order to crosslink the fibers throughout their structure and convert them to heat-stable structures. While other inventions contemplate irradiating the portion of the fibers which will not be potted, the present invention specifically enhances the elevated temperature characteristics of a portion of the fibers to be potted. While it is only necessary to irradiate the potted portion of the fiber, the balance of the fiber may also be irradiated inasmuch as it is typically more efficient to treat the entire bundle.

An exemplary method of irradiating the fibers entails the use of $Co^{60}$ or cesium-137 gamma radiation, although beta radiation may also be used. Sources of radiation may also include electron beam generators, X-ray generators, and the like, provided that the beam energy is sufficient to penetrate substantially the whole fiber. A typical radiation dose to achieve acceptable cross-linking is 5–25 Mrad.

In accordance with the present invention, the enhanced fibers are then embedded in a thermoplastic potting compound using injection molding techniques. As used herein, the term "potting" refers to a process by which a material, or an assembly of small discrete units, is coated with, embedded in, encapsulated by, or sealed with, a molten film or sheath. Plastics used for this purpose are typically called potting compounds. Any thermoplastic potting material capable of being injection molded can be used in the present invention. Preferably a thermoplastic potting material of similar or the same chemical composition as the thermoplastic hollow fibers is used, such as polyethylene, PVDF, polyamides, and polyesters. As used herein, embedding the fibers in the potting compound refers to filling the interstitial area between the fibers and securing them in place.

In a preferred method, once the intermediate section of the bundle of hollow fibers has been fully embedded in the thermoplastic potting compound, i.e., the interstitial areas between the fibers are filled with potting compound, the potting compound is allowed to cool, securing and sealing the fibers in the potting compound.

Once the potting compound solidifies, the interior of the fibers can be exposed, preferably by cutting a portion of the potted section approximately transverse to the longitudinal axis of the fibers.

The irradiated hollow fibers are preferably wound into any of various geometric shapes by wrapping the fibers around a mandrel or core. In a preferred embodiment of the invention, the fibers are wound into an endless or continuous loop having a generally circular configuration, e.g., a donut, hourglass, or multi-noded configuration. Such a technique has the advantage of allowing for multiple hollow fiber separation devices to be prepared simultaneously or near simultaneously, while further ensuring that potting material is not inadvertently deposited in the interiors of the fibers (since the fiber interiors are not exposed until the potting compound is cut).

An exemplary method of producing a module according to the invention comprises extruding a number of hollow fibers into a bundle, irradiating the bundle of fibers under conditions in which the resin of the fibers in the bundle crosslink, forming the bundle of fibers into a donut or hourglass shaped configuration, embedding at least a part of a portion of the bundle of fibers in a molten potting material, the part being an intermediate portion of the bundle, and cutting the bundle across the potted area so as to form at least two modules.

A bundle of thermoplastic hollow fibers embedded in a thermoplastic polymer or resin in accordance with the present invention may be further supported by an open net or mesh bag so that the bundle may be easily carried, shipped, and/or moved. The open net may comprise an ephemeral cage for support while minimizing the amount of material which may contribute to the production of extractables and dirt. Purified water may be passed through the interior of the potted hollow fibers in order to further reduce the amount of extractables in the separatory device.

Figure 2:
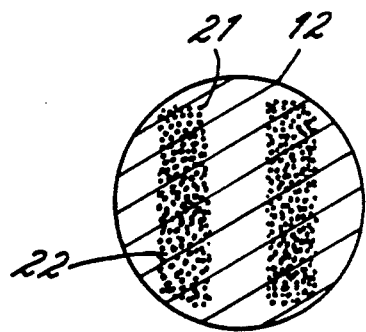
FIG. 2 shows the cross section along line 2—2 of the embodiment shown in FIG. 1.

Illustrative embodiments of the invention may be described by reference to the Figures. FIG. 1 illustrates an embodiment of the invention comprising enhanced thermoplastic hollow fibers 11 formed into an hourglass configuration and embedded in a thermoplastic polymer or resin 12. The embedded fibers may be cut along line 13 in order to form at least one module, preferably two modules. FIG. 2 shows a cross section along line 2—2 of the embodiment shown in FIG. 1 wherein the cut exposes the fiber interior at the potted hollow fibers ends 21 embedded in the thermoplastic polymer or resin 12. As shown in FIG. 2, the interstitial area 22 between fiber ends 21 is filled with the thermoplastic polymer or resin 12.

Figure 3:
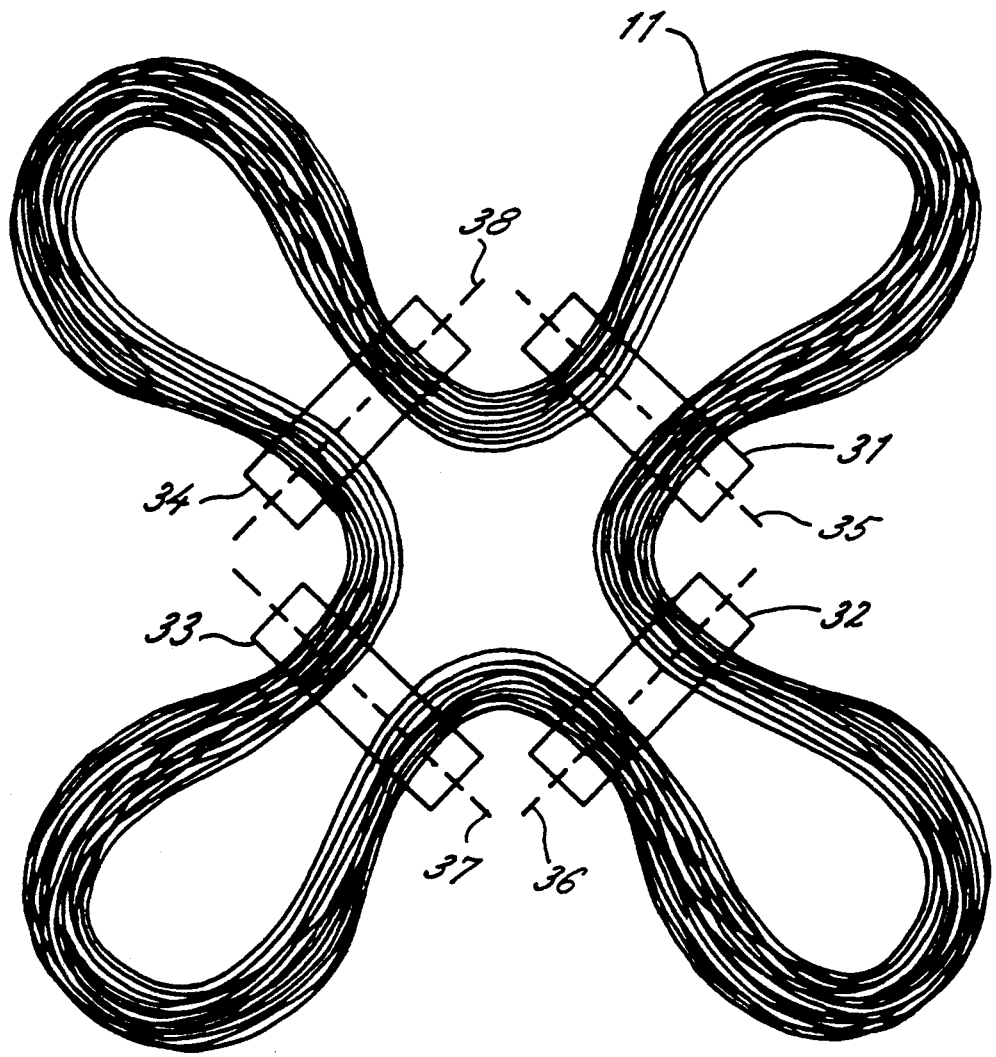
FIG. 3 is a schematic top view of another embodiment of the invention which illustrates a multi-noded configuration of fibers embedded in potting compound.

FIG. 3 illustrates an embodiment of the invention comprising thermoplastic hollow fibers 11 configured into a multi-noded structure wherein each node is potted in thermoplastic polymer or resin 31–34. The potted fibers may then be cut along lines 35–38 such that each node results in a module.

While the invention has been described in detail by way of illustration and example, it should be understood that the invention is susceptible to various modifications and alternative forms and is not restricted to the specific embodiments set forth herein. It should be understood that these specific embodiments are not intended to limit the invention, but, on the contrary, the intention is to cover all modifications, equivalents, and alternatives falling within the spirit and scope of the invention.

I claim:

1. A process for preparing a hollow fiber separatory device comprising:

forming a bundle of thermoplastic hollow fibers, enhancing the elevated temperature characteristics of at least a portion of the thermoplastic fibers sufficient to substantially resist deformation or melting of the fibers elevated temperature including those characteristics of injection molding, embedding at least a part of the enhanced portion of the fibers in a thermoplastic potting compound to form a potted section such that a closed loop of fibers extends from one face of said potted section, and exposing the interior of the potted fibers on an opposite face of said potted section.

2. The process of claim 1 wherein enhancing the elevated temperature characteristics of the fibers comprises irradiating said fibers.

3. The process of claim 1 wherein said bundle of fibers is in a U-shaped configuration having first and second open ends and said bundle of fibers is embedded in said potting compound such that said first and second open ends of the fibers extend through said potting compound to said opposite face of said potted section.

4. The process of claim 1 wherein said bundle of fibers is in a U-shaped configuration having first and second open ends, said first and second open ends of the fibers are embedded in said potting compound, and said potted section is sheared to expose the interior of the potted fibers on said opposite face of said potted section.

5. The process of claim 1 wherein said bundle of fibers includes at least two loops and an intermediate section between said loops and the intermediate section of said bundle of fibers is embedded in said potting compound to form a potted section such that at least two closed loops of said fibers extend from different faces of said potted section.

6. The process of claim 5 wherein exposing the interior of the potted fibers on an opposite face of said potted section comprises cutting said potted section to form at least two hollow fiber separatory devices.

7. The process of claim 1 wherein said bundle of fibers includes at least two loops and at least two intermediate sections between said loops and the intermediate sections of said bundle of fibers are embedded in said potting compound to form separate potted sections such that at least two closed loops of said fibers extend from said potted sections.

8. The process of claim 7 wherein exposing the interior of the potted fibers on an opposite face of said potted sections comprises cutting said potted sections to form at least two hollow fiber separatory devices.

9. A hollow fiber separatory device comprising thermoplastic hollow fibers having end portions embedded in a thermoplastic potting compound, said end portions having been treated prior to being embedded in the potting compound to enhance their elevated temperature characteristics sufficient to substantially resist deformation or melting of the fibers elevated temperature including those characteristics of injection molding.

10. The hollow fiber separatory device of claim 9, wherein said end portions have been irradiated prior to being embedded in the potting compound to enhance their elevated temperature characteristics.

11. The hollow fiber separatory device of claim 10 wherein said end portions have been irradiated with gamma radiation, beta radiation, x-rays or an electron beam.

12. The hollow fiber separatory device of claim 10 wherein said end portions have been irradiated with cobalt-60 gamma radiation or cesium-137 gamma radiation.

13. The hollow fiber separatory device of claim 10 wherein said end portions have been irradiated with radiation of sufficient energy to penetrate substantially the whole fiber.

14. The hollow fiber separatory device of claim 10 wherein the thermoplastic hollow fibers comprise polyethylene, polyvinylidene difluoride, polytetrafluoroethylene, acetate, cellulose ether, polyvinyl alcohol, polysaccharide, polyolefin, polyester, polyamide or polyurethane.

15. The hollow fiber separatory device of claim 10 wherein the thermoplastic hollow fibers are hydrophilic.

16. The hollow fiber separatory device of claim 10 wherein the thermoplastic hollow fibers have been modified to make the fibers suitable for ion exchange purposes.

17. The hollow fiber separatory device of claim 10 wherein the thermoplastic potting compound comprises polyethylene, polyvinylidene difluoride, polyester or polyamide.

18. The hollow fiber separatory device of claim 10 wherein the thermoplastic potting compound has the same chemical composition as the thermoplastic hollow fibers.

* * * * *

UNITED STATES PATENT AND TRADEMARK OFFICE
CERTIFICATE OF CORRECTION

PATENT NO. : 5,228,992
DATED : July 20, 1993
INVENTOR(S) : Peter J. Degen

It is certified that error appears in the above-indentified patent and that said Letters Patent is hereby corrected as shown below:

Claim 1, column 5, line 13, change "elevated temperature" to --at elevated temperatures--.

Claim 9, column 6, line 13, change "elevated temperature" to --at elevated temperatures--.

Signed and Sealed this

Twenty-sixth Day of April, 1994

Attest:

BRUCE LEHMAN

Attesting Officer

Commissioner of Patents and Trademarks